United States Patent

[11] 3,553,349

| [72] | Inventors | Werner Heinzmann<br>Ottobrunn;<br>Siegfried Pfahl, Hagen Holthausen,<br>Germany |
|------|-----------|--------|
| [21] | Appl. No. | 812,277 |
| [22] | Filed | Apr. 1, 1969 |
| [45] | Patented | Jan. 5, 1971 |
| [73] | Assignee | Messerschmitt-Boelkow Gesellschaft mit<br>beschraenkter Haftung<br>Munich, Germany |
| [32] | Priority | Apr. 6, 1968 |
| [33] | | Germany |
| [31] | | No. 1,765,133 |

[54] FLEXIBLE SIGNAL TRANSMISSION CABLE
2 Claims, 6 Drawing Figs.

[52] U.S. Cl. .................................................. 174/113,
174/116, 174/120
[51] Int. Cl. .................................................. H01b 7/04

[50] Field of Search............................................ 174/113,
116, 120

[56] References Cited
UNITED STATES PATENTS
3,163,711  12/1964  Schindler ..................... 174/116

*Primary Examiner*—E. A. Goldberg
*Attorney*—McGlew and Toren

ABSTRACT: A flexible electrical cable for transmitting control signals between a control station and a rapidly moving aerodynamic body includes at least two parallel enamel-insulated conductor wires cemented together in parallel relation and extending centrally through a tension member formed by a large number of thin individual filaments, and further includes a covering closely embracing the wires and the tension member and comprising superposed layers wound around the tension member in opposite respective angular directions.

PATENTED JAN 5 1971

INVENTORS
Werner Heinzmann
Siegfried Pfahl

By Mason and Toren
ATTORNEYS

FLEXIBLE SIGNAL TRANSMISSION CABLE

BACKGROUND OF THE INVENTION

Flexible cables for transmitting signals between a control station and a rapidly moving aerodynamic body are known. They consist of at least two approximately parallel, enamel-insulated metallic conductor wires which are imbedded in a tension member comprising many thin, parallel filaments of natural silk or synthetic fibers. The conductor wires and the tension member are covered with a close wrapping of natural or synthetic filaments.

Cables of this kind have proven to work out extremely well for the transmission of signals to moving aerodynamic bodies, up to velocities of approximately 90 m./sec. and ranges of 1,800 m. However, suddenly increasing requirements are placed on the velocity and range of such aerodynamic bodies, as the targets which are intended to be reached by these bodies are also steadily increasing their radius of action and their velocity. The increase of the velocity of such aerodynamic bodies is essentially limited only by the transmission of signals through the flexible cables, and it is not desirable to abandon readily such transmission cables because of their overriding advantage with respect to security of signal transmission in the presence of interference by a potential enemy.

As, for reasons of flight mechanics, the supply of cable for the signal connection must be carried in the aerodynamic body, the payload of the latter is reduced by the cable. Any increase in range therefore causes an increase in the supply of cable and thus the shortcomings mentioned above.

An increase of the velocity of the aerodynamic body causes an increase in the payout speed of the cable and thus an increase of the static and dynamic stresses on the cable cable in unwinding from the supply reel located in the aerodynamic body. To a corresponding increase in the cable cross section, there is opposed the requirement to accommodate a greater length of cable, which calls for a reduction of the cross section, in order to accommodate, in the same space in the aerodynamic body, and with as nearly as possible the same weight, greater lengths of cable.

In this connection, the elasticity of the cable must not be sacrificed, and the tendency to form kinks must not be increased, as this constitutes one of the greatest dangers of breakage. If, for instance, the tension member and the conductor wires are differently strained by a suddenly occuring dynamic load, then, upon the disappearance of this load, bends are formed which break under the next occurring load and these lead to the destruction of the signal connection.

Additionally, the requirements as to the electrical properties of such cables are increased. As, with present manufacturing methods, parallelism of the conductor wires over the length of the cable can never be assured, the line capacitance changes continuously, and this has a detrimental effect with increasing range. A further substantial disadvantage is the constantly changing position of the conductor wires and the tension member. The insulation resistance and the resistance to thermal and mechanical influences consequently changes randomly over the length of the cable. Due to the sag of long cable lengths and the contact with the ground or water caused by such sags, the conductor wires located immediately beneath the covering often are damaged and even may be destroyed.

Mechanical and thermal stresses of such a cable are particularly great at the launching of the aerodynamic body which, as a rule, is propelled by a hot gas jet, as, on the one hand, the aerodynamic body is accelerated from zero velocity to its cruising velocity and the cable is greatly stressed dynamically by the rapid increase in the unwinding velocity and, on the other hand, the cable is in the immediate vicinity of the gas jet during this phase. In the cruising phase, the cable is impacted in an uncontrollable manner by hot particles which separate from the always present burning flare unit which is attached to the aerodynamic body. Consequently, if the conductor wires are located somewhere in the immediate vicinity of the covering of the cable, and if the latter comes too close to the gas jet, or if it is hit by particles from the flare, damage to the insulation, or even destruction of the insulation, of one or the other of the conductor wires, or even to the conductor itself, are unavoidable. Even if only damage occurs, the damaged section will certainly break when the next mechanical stress occurs.

Finally, the constantly changing position of the conductor wires in the tension member also affects the unwinding properties of the cable in a most unfavorable sense, as the flexural stresses imparted to the cable during unwinding or unreeling change continually over the length of the cable and almost each turn exhibits a different unwinding characteristic upon each unwinding.

As a result of all of these factors, known electric cables of this type prevent the obtaining of larger ranges and greater unwinding speeds, and therefore prevent the attaining of greater cruising speeds of aerodynamic bodies equipped with these cables.

SUMMARY OF THE INVENTION

This invention relates to electrical cables for transmitting control signals between a control station and a rapidly moving aerodynamic body and, more particularly, to a novel cable of this type, to a novel method of manufacturing the same, and to novel apparatus for manufacturing the same.

The objective of the invention is to provide a flexible electrical cable for the transmission of signals between a control station and a rapidly moving aerodynamic body which is free of the disadvantages of the prior art, which is suitable for substantially greater payout speeds than hitherto possible, and which permits the obtaining of greater ranges than presently possible. Furthermore, the invention is directed to producing such a cable which exhibits defined electrical characteristics, especially approximately constant values of capacitance, and which, on the basis of its construction and method of manufacture, can be subjected to high mechanical stresses with a simultaneous reduction in weight in savings in cost.

The improved cable of the present invention is based upon a flexible electrical cable for the transmission of signals between a control station and a rapidly moving aerodynamic body, and including at least two parallel, enamel-insulated conductor wires imbedded in a tension member formed by many thin individual filaments with a cover closely enclosing the conductor wires and tension member. In accordance with the invention, an improved cable is provided by cementing the conductor wires together in parallel relation and arranging the conductor wires to extend centrally of the tension member, which latter is surrounded by a coating comprising superposed layers wound around the tension member in opposite respective angular directions.

In a particularly advantageous form of the flexible cable, the conductor wires comprise the purest possible electrolytic copper having an elongation of more than 25 percent and have, in the bare condition, a diameter of 0.07 mm. The tension member comprises $n$-parallel strands of fibers of approximately 14 $\mu$ diameter, each comprising polyester fiber. The plural layer covering comprises natural silk of 4 x 13/15 den. composition.

In a preferred method for the manufacture of a flexible electric cable embodying the invention, the conductor wires, which have been insulated in an enameling process separately from each other, and after being cemented together in parallel relation, are surrounded by the strands of carrier filaments of polyester fibers which extend symmetrically and are subsequently covered with the natural silk fibers. For this purpose, the conductor wires and the carrier filament strands are presorted and fed, in a defined and controlled manner, to a first spinning head which may be, for example, a right-hand spinning head, and subsequently to a second spinning head which may be, for example, a left-hand spinning head, so that the oppositely wound covering layers are applied in two successive spinning operations with the same lay but opposite senses of rotation.

It is especially advantageous that the tension member is formed by at least three carrier filament strands, and immediately prior to the first spinning operation, the conductor wires, cemented together in parallel relation, are fed centrally to the first spinning head with the individual carrier filament strands being offset angularly by 120° around a small radius circle concentric with the conductor wires. In accordance with a further feature of the invention, the carrier filament strands are fed to the spinning head in ribbon form, and the conductor wires in the carrier filament strands are fed perpendicularly, at least during the spinning process. It is further advantageous that the conductor wires are subjected to a tension of approximately 40g. during feeding to the spinning head, and that the elastic elongation of the carrier filament strands, prior to spinning, is reduced to about 7 percent to 8 percent by suitable measures.

An arrangement for covering the bundle consisting of conductor wires and the tension member comprises, in accordance with the invention, two serially arranged wire-spinning heads of a known design. The first wire-spinning head has a fixed axle extending through it and which, for the purpose of feeding the conductor wires cemented together in parallel relation and the individual carrier filament strands, to the spinning head which performs the spinning, is performed with an axially extending passage or bore. A guide plate is arranged near the spinning head and has a central opening for the conductor wires and, concentrically with this opening, openings for the carrier filament strands arranged on a small radius circle and angularly offset by 120° from each other.

A flexible electric cable for the transmission of signals between a control station and a rapidly moving aerodynamic body, constructed and manufactured in accordance with the invention, exhibits extraordinary mechanical strength and relatively small elongation. Its elongation is less than 10 percent. An advantage is that the conductor wires are arranged centrally in the tension member over the entire length of the cable. They are therefore located in the neutral axis with respect to flexural stresses, and can no longer be damaged or destroyed by internal friction forces and other external forces acting upon the cable within the permissible stress. The parallel cementing of the conductor wires together assures constant electrical properties, especially constant line capacitance.

As the elastic elongation of a carrier filament strand, before the covering is applied to the same, is reduced to approximately 7 percent to 8 percent, the conductor wires consist of electrolytic copper of the highest purity and of high elongation and are located centrally in the tension member comprising polyester fibers, and as the covering is of natural silk and is applied in successive layers which are wound in opposite directions, the cable is lightweight, has a small diameter, is free of internal torsion strains, exhibits excellent unwinding properties, and is insensitive, to the greatest extent, against dynamic stresses and bending stresses. The formation of kinks becomes nearly impossible so that, with a cable constructed in accordance with the invention, payout velocities, previously considered impossible, of up to approximately 300 m./sec. and aerodynamic body ranges of up to approximately 6,000 m. are attainable.

A substantial saving in weight and cost is obtained due to the reduction in the diameter of the conductor wires and the use of polyester fibers in place of natural silk for the carrier filament strands.

For an understanding of the principles of the invention, reference is made to the following description of a typical embodiment thereof as illustrated illustrated in the accompanying drawings.

IN THE DRAWINGS

FIG. 1 somewhat schematically illustrates a cable, embodying the invention, in operation during flight of an aerodynamic body;

Figure 1:
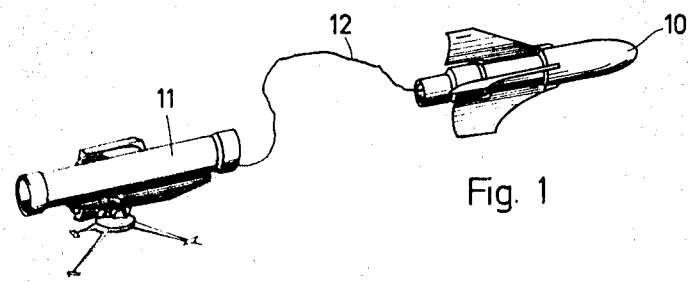

Referring to FIG. 1, a reaction-propelled aerodynamic body 10 is illustrated as supplied with control signals from a control station 11 through the medium of a flexible electrical cable 12 connecting the control station and the aerodynamic body.

Cable 12 consists of two electrical conductor wires 14 having a diameter of approximately 0.07 mm., made of electrolytic copper of the greatest possible purity and having a high elongation equal to or greater than 25 percent. Prior to being covered, the bare copper conductors 14 are individually provided with insulation 15 by means of a known enameling process, the application of the enamel being effected in several layers until an enamel increment of at least 24 to 30 $\mu$ is obtained. After hardening of insulation 15, the individual copper conductors are cemented together in parallel relation by means of a further operation, using the same enamel as used for the insulation 15, so that they assume the form shown in FIG. 2.

Figure 2:
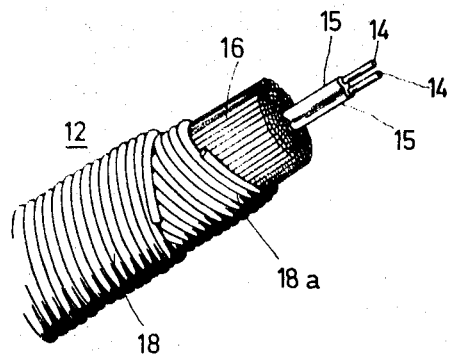
FIG. 2 is a partial perspective view, to a greatly enlarged scale, illustrating the construction of a cable embodying the invention.
Figure 3:
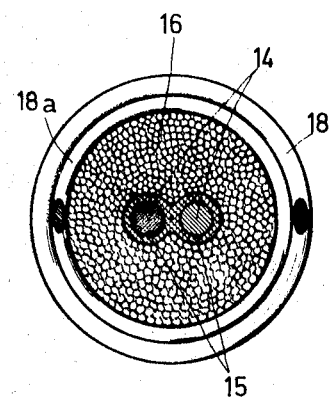
FIG. 3 is a greatly enlarged photo micrograph in a plane perpendicular to the longitudinal axis of the cable shown in FIG. 2.

As shown in FIGS. 2 and 3, copper conductors 14, which are thus cemented together in parallel relation, are located centrally in a carrier filament bundle or tension member 16 consisting of small $n$-parallel polyester fibers. The bundle, consisting of the carrier filament bundles 16 and the copper conductors 14, is provided with a plural layer covering 18, 18a, with the layers being wound in mutually opposed directions, consisting of natural silk of a composition 4 x 13/15 den.

Figure 4A:
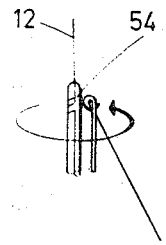
FIG. 4a illustrates a part corresponding to FIG. 4 but included in a second spinning device.
Figure 4:
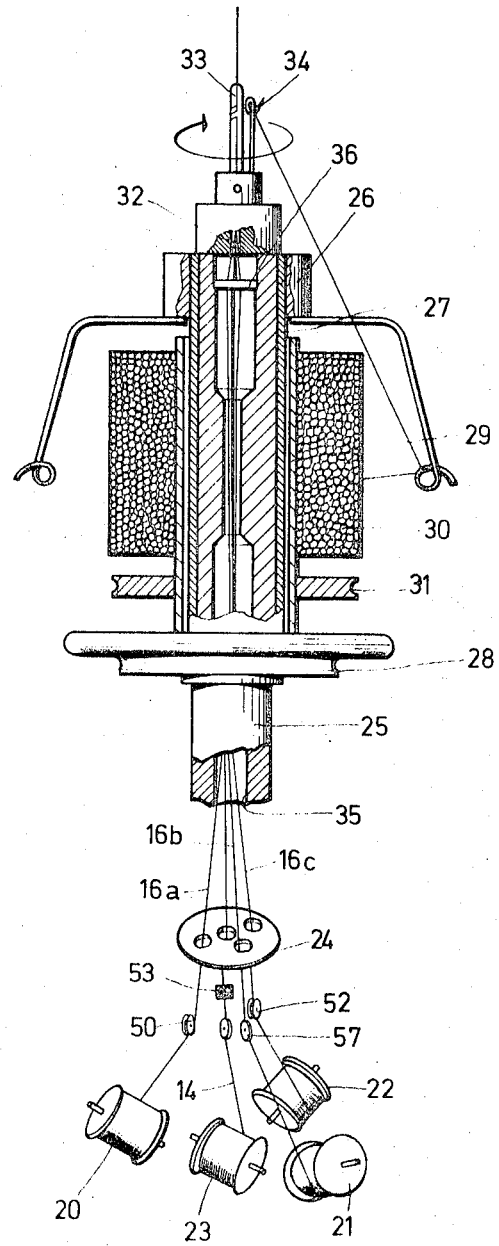
FIG. 4 is a part elevation and part sectional view of apparatus for manufacturing the cable shown in FIGS. 2 and 3.

In order to attain a central location of copper conductors 14, cemented together in parallel relation, within carrier filament bundle 16 over the entire length of cable 12, carrier filament bundle 16 is subdivided, prior to spinning, and into at least three equal carrier filament strands 16a, 16b and 16c, each of which has a diameter of approximately 14 $\mu$ and consists of 70 elemental fibers, and which are on reels 20, 21 and 22, as shown in FIG. 4.

As may be seen further from FIG. 4, the carrier filament strands pulled off the reels, and the copper conductors 14 pulled off a reel 23, are presorted by means of a perforated plate 24 and led to a first wire-spinning head. The first wire-spinning head comprises a fixed spindle 25 on which is rotatably supported a sleeve 27 carrying a so-called flyer 28 in a manner not shown in detail. By means of a spring bushing 29, a bobbin 30 is arranged on sleeve 27 and is wound with natural silk filaments of composition 4 x 13/15 den., and the bobbin is braked by brake strap which operates on a disc 31 but which has not been illustrated. A so-called spinner bracket 33, having a hole 32 and a filament guide 34, is fixedly connected with flyer 26 and constitutes the spinning head proper.

Figure 5:
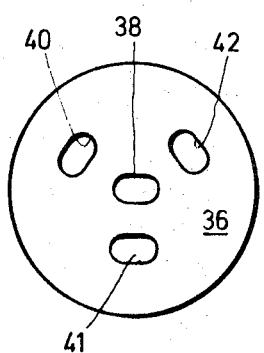
FIG. 5 is a top plan view of a guide plate included in the arrangement shown in FIG. 4, to a greatly enlarged scale.

Fixed spindle 24 has an axial passage or bore 35 extending completely therethrough, and the top end of spindle 24, as viewed in FIG. 4, carries a guide plate 36 shown more particularly in FIG. 5. Guide plate 36 is provided with a central opening 38 and openings 40, 41 and 42 arranged around a small diameter circle concentric with opening 28 and angularly offset from each other by 120°.

By means of guide plate 36, carrier filament strands 16a, 16b and 16c, presorted and fed through the passage 35, are led in such a manner, relative to conductor wires 14 which are cemented together in parallel relation and which are also fed through passage 35, that the carrier filament strands surround the centrally fed copper conductors in a small diameter circle and offset angularly from each other by 120°. Upon feeding of the carrier filament strands into the hole 32, they enclose copper conductors 14 symmetrically. The relative position of the carrier filament strands and copper conductors is fixed immediately thereafter by a first layer 18a of covering 18, which is generated by the spinning head which joins the fixed guide plate 36 and which is driven in a clockwise direction.

The arrangement described above corresponds to a so-called sleeve-bearing wire-covering machine of known construction, in which fixed spindle 25 serves as the feed element for the carrier filament strand which is to be fed to the spinning head, and contains centrally the copper conductors cemented together in parallel relation, the central location of the copper conductors, cemented together in parallel ribbon form, being automatically assured by guide plate 36.

While the carrier filament strands are pulled off their respective reels only through guide rollers 50, 51 and 52, an additional brake 53, which produces a braking force of about 40g., as associated with the copper conductors. The second layer of covering 18, which is wound in a counterclockwise direction or in a direction opposite to the direction of winding of the first layer 18a, is produced by means of a corresponding further wire spinner, of known construction, of which only the spinner bracket 54 is shown in FIG. 4a. The completed cable 12 leaving this second wire spinner is wound on a reel, which has not been shown.

The concentricity of the arrangement of copper conductors 14 and area filament bundles 16 is the better the smaller the distance between guide plate 36 and spinner bracket 33 and if, at least in the first wire spinner, the carrier element strands and the copper conductors, which are cemented together in parallel relation, are fed perpendicularly. Instead of the tension member being divided into three carrier filament strands, any other kind of subdivision can, of course, be chose, for example, subdividing the tension member into nine or 12 strands or bundles.

We claim:

1. In a flexible electrical cable for transmitting control signals between a control station and a rapidly moving aerodynamic body, and including at least two parallel enamel-insulating conductor wires imbedded in a tension member formed by a large number of thin individual filaments, and a covering closely embracing the conductor wires and the tension member: the improvement comprising said conductor wires being cemented together in parallel relation and extending centrally of said tension member throughout the length of said cable; said covering comprising superposed layers of covering material wound around said tension members in opposite respective and angular directions.

2. In a flexible electrical cable, the improvement claimed in claim 1, in which said conductor wires consist of electrolytic copper of the greatest possible purity with an elongation equal to at least 25 percent and having, in the bare condition, a diameter of 0.07 mm., the tension member consisting of $n$-parallel filament strands of 14 $\mu$ diameter polyester fiber having an elongation of approximately 7 percent to 8 percent, and the covering comprising natural silk of composition 4 x 13/15 den.